(12) United States Patent
Bonola

(10) Patent No.: US 6,697,927 B2
(45) Date of Patent: Feb. 24, 2004

(54) CONCURRENT NON-BLOCKING FIFO ARRAY

(75) Inventor: Thomas J. Bonola, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 246 days.

(21) Appl. No.: 09/966,478

(22) Filed: Sep. 28, 2001

(65) Prior Publication Data

US 2003/0065892 A1 Apr. 3, 2003

(51) Int. Cl.⁷ ................................................ G06F 12/00
(52) U.S. Cl. .................... 711/168; 711/147; 710/20; 710/21; 710/52
(58) Field of Search .................. 711/147–148, 153, 711/168; 710/5–7, 20–21, 52–54, 200, 220, 240–244

(56) References Cited

U.S. PATENT DOCUMENTS 5,812,799 A * 9/1998 Zuravleff et al. ............ 710/52
6,178,473 B1 * 1/2001 Bonola ....................... 710/54
6,480,918 B1 * 11/2002 McKenney et al. ......... 710/200

OTHER PUBLICATIONS

"Simple, Fast, and Practical Non–Blocking and Blocking Concurrent Queue Algorithms", Maged M. Michael, Michael L. Scott, Department of Computer Science, University of Rochester, Rochester, NY 14627–0226.

* cited by examiner

Primary Examiner—Nasser Moazzami

(57) ABSTRACT

A technique for providing concurrent non-blocking access to a circular queue is provided. The concurrent non-blocking circular queue also may be configured such that cache-coherent requesters and a non-cache-coherent requester (e.g., software and hardware) both may concurrently access the queue. Further, the queue may be configured such that the probability of occurrence of the ABA race condition may be minimized.

24 Claims, 8 Drawing Sheets

CONCURRENT NON-BLOCKING FIFO ARRAY

BACKGROUND OF THE INVENTION

1. Field of the Invention

The present invention relates generally to a queue structure for a processor-based device and, more particularly, to a technique for facilitating concurrent non-blocking access to an array of queued entries in a processor-based device (e.g., a server).

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The use of computers has increased dramatically over the past few decades. In years past, computers were relatively few in number and primarily used as scientific tools. However, with the advent of standardized architectures and operating systems, computers soon became virtually indispensable tools for a wide variety of business applications. The types of computer systems similarly have evolved over time. For example, early scientific computers typically were stand-alone systems designed to carry out relatively specific tasks and required relatively knowledgeable users.

As computer systems evolved into the business arena, mainframe computers emerged. In mainframe systems, users utilized "dumb" terminals to provide input to and to receive output from the mainframe computer while all processing was done centrally by the mainframe computer. As users desired more autonomy in their choice of computing services, personal computers evolved to provide processing capability on each user's desktop. More recently, personal computers have given rise to relatively powerful computers called servers. Servers are typically multi-processor computers that couple numerous personal computers together in a network. In addition, these powerful servers are also finding applications in various other capacities, such as in the communications and Internet industries.

In many servers, multiple requesters (e.g., software threads, hardware, etc.) may contend for access to shared resources, such as memory. Each time a requester accesses memory, it is likely that the contents of a memory location will be altered. Thus, care must be taken in a system that provides for concurrent access to a shared resource to ensure that a requester is accessing valid data. In addition to problems arising from concurrent requests, a requester that has control of the resource may be interrupted, thus providing yet further opportunity for another requester to alter the contents of the shared resource. Without some sort of scheme to govern requests for access to a shared resource, data processing errors or unrecoverable faults may occur.

In many systems, multiple requests to a shared resource are governed by an arbitration scheme which grants only one requester at a time access to a shared resource. The arbitration scheme typically results in a lock being placed on the critical region of the shared resource such that the other requesters are blocked until the current requester has completed the operation and released the lock. Such arbitration schemes become less effective as the number of requesters increases, as each requester must wait its turn to access the resource. Further, because the acts of attaining and releasing the lock may result in communications being transmitted to each of the other requesters, consumption of bus bandwidth bus and latency increase. Thus, these arbitration schemes may not readily scale to execution environments in which a large number of concurrent requests to a shared resource are possible.

Further, because access requests may be generated by entities which are not synchronous with each other, many such arbitration schemes typically involve operating system support to synchronize and arbitrate between requests, thus further increasing latency and affecting scalability. Still further, blocking arbitration schemes may have a detrimental effect on the reliability of the system, because such schemes may create a deadlock situation if the owner of a lock aborts or terminates before releasing the lock. Thus, availability of the server may be compromised, which may be disastrous for many types of applications.

To overcome the disadvantages of the blocking arbitration schemes discussed above, algorithms have been developed which facilitate concurrent, non-blocking access to shared resources by multiple requesters and eliminate the need for bus master and operating system arbitration and synchronization. Ideally, a concurrent non-blocking algorithm provides for concurrent access to a shared resource by multiple requesters and ensures that a requester never will be blocked from access even if a previous requester abruptly terminates or aborts during the access to the resource. Because forward progress by other requesters is not hindered by a lock, such non-blocking algorithms can contribute to higher reliability and increased chance of continued availability of the system.

Another type of problem may occur with many known concurrent non-blocking algorithms, however, which may result in operational errors or deadlock situations. This problem involves a race condition that is referred to as the "ABA" condition. The ABA condition may occur when a first requester accesses queued data stored in a shared memory resource, but loses context before completing the operation which involved the access to memory. For instance, when accessing a shared memory location, the first requester initially may take a snapshot of the data stored in the memory location. If, for some reason, the first requester loses context before completing the memory operation, the data at the memory location may be altered by one or more other requesters. Generally, alteration of the data does not present a problem since, when the first requester regains context, the first requester can determine whether the data has been altered by comparing the present data with the snapshot taken prior to losing context.

The ABA condition arises when it appears that the same data value is stored at the memory location in the queue when the first requester regains context, but, the memory location actually had been written to multiple times and pointers to current and next locations in the queue incremented while the first requester was asleep. For instance, the first requester may take a snapshot of data "A" at the current location before losing context. The next requester removes "A" from the current location in the queue and increments the queue pointer. Then, when the location again becomes current, the requester writes data "B" to the memory location. Then, "B" is removed, "A" is written to that memory location, and queue pointers are incremented. When the first requester regains context, the first requester examines the memory location and sees "A." Thus, it appears that the contents of the memory location have not changed and that the first requester is accessing the queue in the correct order. In reality, however, the pointer to the current location or to the next location in the queue may have been altered. Thus, if the first requester performs the access, errors in queue operations may result.

Accordingly, it would be desirable to provide a queue structure that could be concurrently accessed by multiple requesters and that did not employ hardware or software locks or other form of synchronization from the operating system. Still further, it would be desirable if concurrent non-blocking access could be provided in a manner that minimizes the risk of the occurrence of the ABA race condition.

The present invention may be directed to addressing one or more of the problems set forth above.

DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
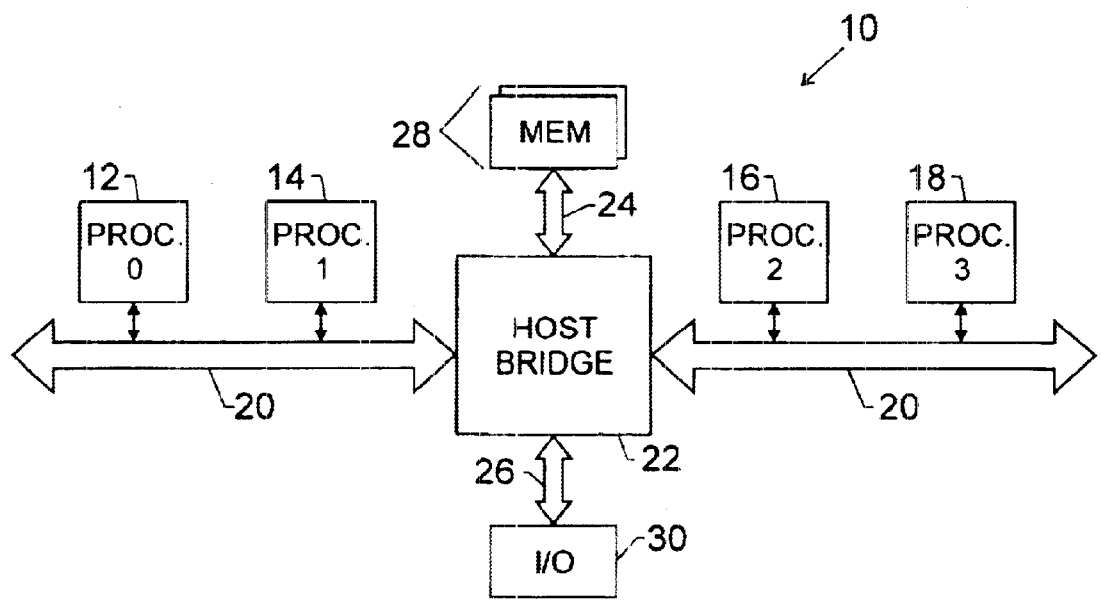
FIG. 1 illustrates a block diagram of an exemplary processor-based device.

Turning now to the drawings and referring first to FIG. 1, an exemplary processor-based device 10 is illustrated in which the innovative concurrent non-blocking queue may be utilized. The processor-based device 10 is a multi-processor device, such as a server, which includes processors 12, 14, 16, and 18 coupled to a host bus 20. The processors 12, 14, 16, and 18 may be any of a variety of types of known processors, such as an x86 or PENTIUM® based processor, an ALPHA® processor, a POWERPC® processor, etc. The host bus 20 is coupled to a host bridge 22 which manages communications between the host bus 20, a memory bus 24, and an I/O bus 26. The memory bus 24 connects the processors 12, 14, 16, and 18 to a shared memory resource 28, which may include one or more memory devices, such as ROM, RAM, DRAM, SRAM, etc. The I/O bus 26 provides for communications to any of a variety of input/output or peripheral devices 30 (e.g., a modem, printer, etc.), which may be shared among the multiple processors 12, 13, 16, and 18 and which also may have access to the shared memory resource 28.

Various other devices not shown also may be in communication with the processors 12, 14, 16, and 18. Such other devices may include a user interface having buttons, switches, a keyboard, a mouse, and/or a voice recognition system, for example.

Figure 2:
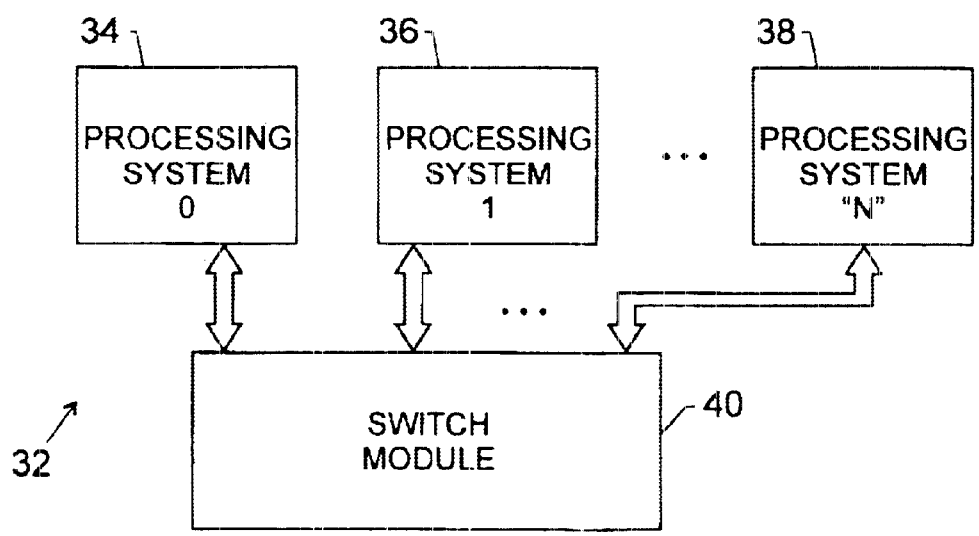
FIG. 2 illustrates a block diagram of another exemplary processor-based device.

FIG. 2 illustrates another exemplary embodiment of a processor-based device 32 (e.g., a server) which may implement the concurrent non-blocking queue of the present invention. In this embodiment, multiple processing systems 34, 36, and 38 are connected to a cache-coherent switch module 40. Each processing system 34, 36, and 38 may include multiple processors (e.g., four processors), and each system 34, 36, and 38 may be configured substantially similar to the processor-based device 10 illustrated in FIG. 1.

In the embodiments of a processor-based device illustrated in FIGS. 1 and 2, it can be seen that it is possible to have several entities concurrently attempting to access a shared resource. Arbitration schemes which rely on a central arbiter to govern requests to a shared resource and which are implemented via the use of locks generally have a detrimental effect on latency. Further, such schemes are quite intrusive on the buses and the host bridge or switch module of the processor-based device because the schemes involve the exchange of many communications between the entities having access to the shared resource. For example, each time a requester gains control of a lock, a message must be sent to all other entities having access to the shared resource. Similarly, each time a lock is released, a message is sent to the other entities. Once the lock is released, the requesters all retransmit their requests in an attempt to gain ownership of the lock.

The concurrent non-blocking technique for implementing a queue, which is described below, is less intrusive on the communication media of the processor-based device and has little impact on latency. Further, because the technique does not employ locks, availability of the processor-based device is assured even though an entity may abruptly abort or terminate during an access to a shared resource. Still further, the technique is implemented in such a manner that a queue may be accessed concurrently by cache-coherent entities and a non-cache-coherent entity, if desired. For instance, both software threads and hardware can have concurrent access to data stored in the same queue structure.

Figure 3:
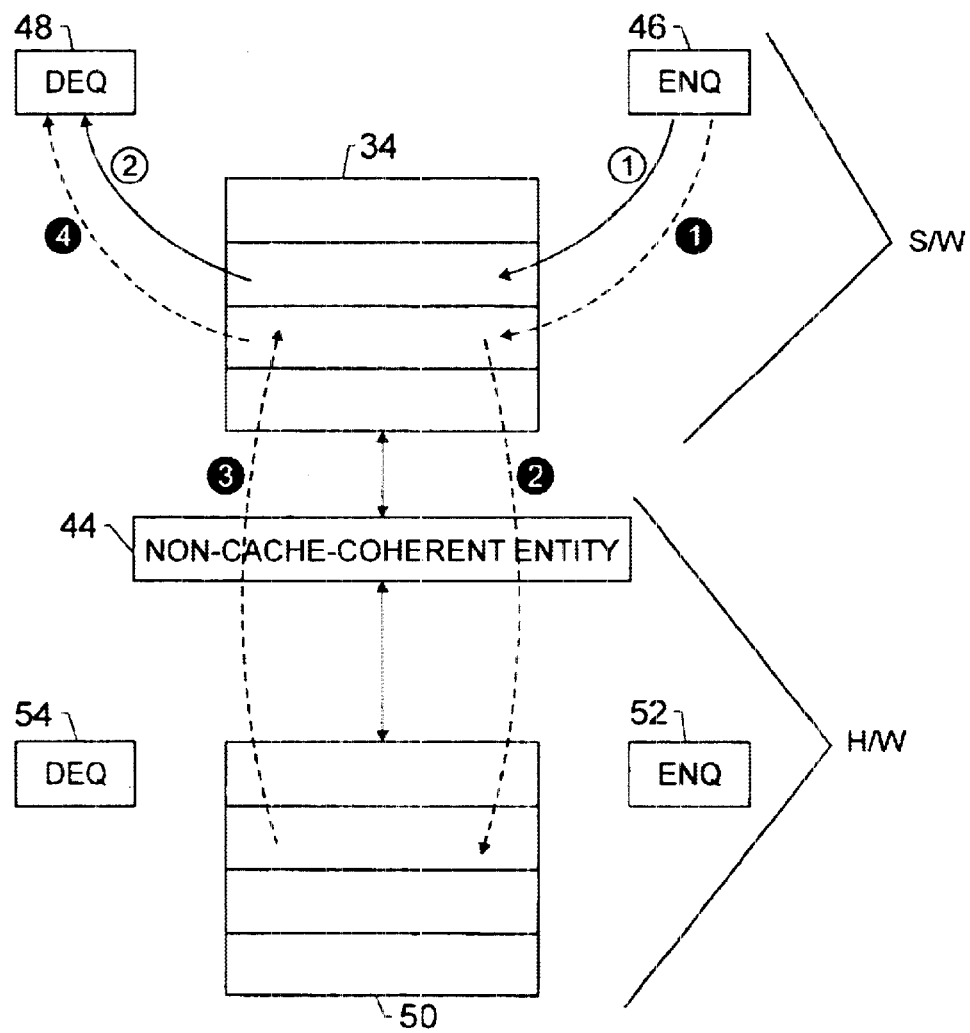
FIG. 3 illustrates an exemplary embodiment of a queue data structure that may be utilized with the processor-based device of FIGS. 1 and 2, and which can be accessed concurrently by cache-coherent entities and a non-cache-coherent entity and utilized with the concurrent non-blocking queuing technique described herein.

FIG. 3 illustrates an exemplary queue data structure 42 which can be accessed concurrently by cache-coherent entities (e.g., software threads or processors) and a non-cache-coherent entity (e.g., hardware). Cache-coherent entities are entities which participate in the same cache coherency protocol. Non-cache-coherent entities, on the other hand, do not participate in the same cache coherency scheme as the cache-coherent entities (i.e., the host processor(s)) in the processor-based device. For instance, in the exemplary embodiment, the queue data structure 42 is implemented in software as an array of 64-bit entries which can be concurrently accessed in a First In First Out (FIFO) or circular manner by software threads and/or hardware (i.e., the non-cache-coherent entity 44). In a runtime mode in which the queue 42 may be accessed only by cache-coherent entities, data enqueued in an entry in the queue 42 by a cache-coherent software enqueue function 46 may be dequeued as soon as possible by a cache-coherent software dequeue function 48. The solid arrows illustrated in FIG. 3 represent the "software only" or "cache-coherent only" mode of operation, showing that the dequeue labeled ② can occur immediately after the enqueue labeled ①.

In a mode of operation in which a non-cache-coherent entity (e.g., hardware) may access the FIFO queue 42 concurrently with the cache-coherent entities, the software dequeue function 48 may not occur prior to ensuring that the non-cache-coherent entity 44 has had the opportunity to access the queue and mark the associated entry in a manner that indicates that the access has been completed. The non-cache-coherent entity 44 implements its own queue structure 50, enqueue function 52 and dequeue function 54 to track and manage access to the software queue structure 42 in an appropriate manner. The non-cache-coherent mode of operation is represented in FIG. 3 by the dashed arrows. After the software enqueue function 46 has placed data in the queue 42 (represented by the dashed arrow labeled ❶), the non-cache-coherent entity 44 may read the enqueued entry (represented by the dashed arrow ❷) and write it to the queue structure 50 (e.g., gates and registers) using the non-cache-coherent enqueue function 52. The non-cache-coherent entity 44 then writes the entry back to the queue 42 (represented by the dashed arrow ❸) so that it can be dequeued by the software dequeue function 48 (represented by the dashed arrow ❹). The non-cache-coherent dequeue function 54 may dequeue entries from the queue structure 50 as needed by the non-cache-coherent entity 44.

In an exemplary embodiment, to ensure that the software dequeue function 48 does not remove the entry from the queue 42 prior to the non-cache-coherent entity 44 accessing the entry, the cache-coherent dequeue function 48 is configured to first examine the contents of the entry in the queue 42 to determine whether it can be removed. This determination is facilitated by configuring the non-cache-coherent entity 44 to alter the state of one of the bits of the data when writing it back to the entry in the queue 42 to indicate that the entity 44 has "consumed" (i.e., accessed) the data and, thus, the data can be removed from the queue 42 by the cache-coherent dequeue function 48.

Figure 4:
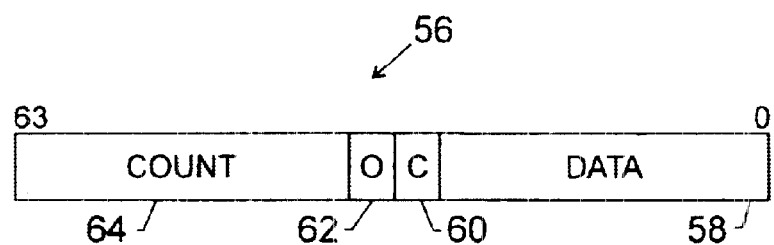
FIG. 4 illustrates an exemplary embodiment of the format of a 64-bit entry that may be utilized with the concurrent non-blocking queuing technique described herein.

FIG. 4 illustrates an exemplary embodiment of the format of a 64-bit entry 56 which may be utilized with the concurrent non-blocking queuing technique described herein. It should be understood that although the entry 56 is illustrated as a 64-bit entry, other size entries also may be used, such as a 32-bit entry, a 128-bit entry, etc. The entry 56 illustrated in FIG. 4 includes a Data field 58 for bits representing the data, a Consumed bit 60 indicating whether the data in the field 58 can be dequeued by the dequeue function 48, an Occupied bit 62 indicating whether data has been loaded in field 58 by the enqueue function 46, and a Count field 64 which is utilized to minimize the probability that the ABA race condition will occur.

In the exemplary embodiment, the size of the Data field 58 and the Count field 64 and the locations of the Consumed bit 60 and the Occupied bit 62 are determined by a queue setup routine. The setup routine, which will be described below, provides an interface via which a user can define values for certain parameters for the queue 42, such as the desired number of entries, the desired number of valid data bits for each entry 56, and whether the queue 42 can be accessed by cache-coherent entities only or by both cache-coherent and a non-cache-coherent entities.

Figure 5:
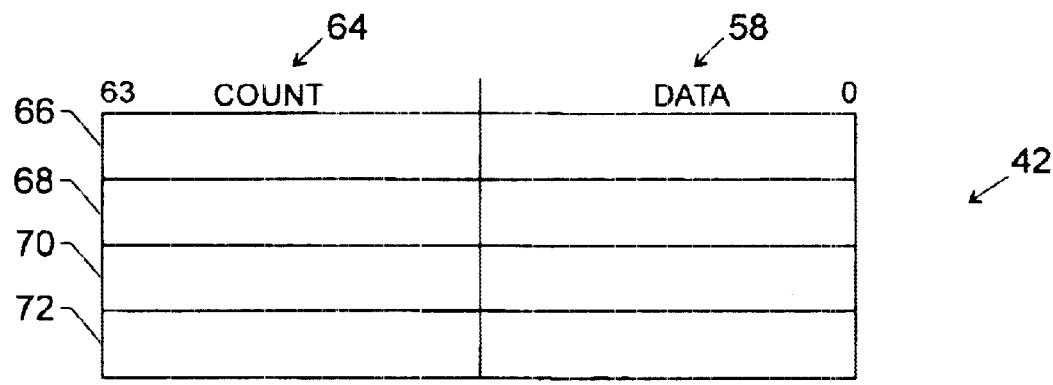
FIG. 5 illustrates a FIFO queue structure having a data field and a count field that may be utilized to prevent occurrence of the ABA condition.

The manner in which the Count field 64 is used to avoid the ABA race condition will be described with reference to FIG. 5, which shows a FIFO queue structure 42 having four entries 66, 68, 70, and 72, each of which includes a Data field 58 and a Count field 64. The Count field 64 contains a count of the number of times data has been enqueued and/or dequeued from the particular entry. For instance, in the exemplary embodiment, when executing either the enqueue or dequeue functions 46 and 48, a snapshot is taken of the contents of the current entry (e.g., the entry 72). Both the dequeue and enqueue functions 46 and 48 further are configured to verify the contents of the current entry 72 during an atomic (i.e., non-interruptible) operation in which data either is enqueued into the current entry 72 or dequeued from the current entry 72. If the comparison does not result in a match, then the atomic operation fails and the enqueue or dequeue function then may be re-initiated.

In the exemplary embodiment, each time data is dequeued from an entry in the queue 42, the count in the Count field 64 is incremented. Thus, if the requester that took the snapshot of entry 72 loses context before completing the enqueue or dequeue function, when the requester regains context, it can determine whether it is accessing the entry 72 by comparing the present contents of the entry (i.e., the contents of the Data field 58 and the Count field 64) to the snapshot taken prior to losing context. An erroneous match of values will occur only if the count in the Count field 64 in the entry 72 has wrapped back to the snapshot Count value and the data in the Data field 58 matches the snapshot Data value when the count has wrapped. Accordingly, the ABA race condition has no probability of occurring unless the contents of the Count field 64 wrap before the requester regains context. In other embodiments, the Count field 64 may be incremented or otherwise altered when the data is enqueued into the entry.

The time to wrap ($T_W$) the contents of the Count field 64 is dependent on several variables. These variables include the average time duration for each access to memory ($T_A$), the number of bits in the Count field 64 (C), the number of entries in the FIFO queue 42 (F), and the number of shared memory operations performed by the enqueue and dequeue algorithms (A). This relationship can be expressed as follows:

$$T_W = T_A * A * F * 2^C$$

Assuming that the average memory access time $T_A$ is (at best) 10 ns, the number of entries F is 4, the number of shared memory operations A within the enqueue and dequeue algorithms before the count increments is 12, and the number of bits C in the Count field is 32, then the time $T_W$ that will elapse before the ABA race condition has a possibility to occur is approximately 34 minutes. The probability that the ABA race condition will occur then depends on the probability that the same data will be rewritten to and will still be in the same memory location after the elapse of $T_W$. However, if 34 minutes have elapsed without the requester having regained context, then it is more likely that some other more serious systemic event has occurred which will prevent the requester from ever regaining context. Thus, implementation of the queue structure 42 using the Count field 64 in the manner described above virtually ensures that the ABA race condition can be avoided.

Figure 6:
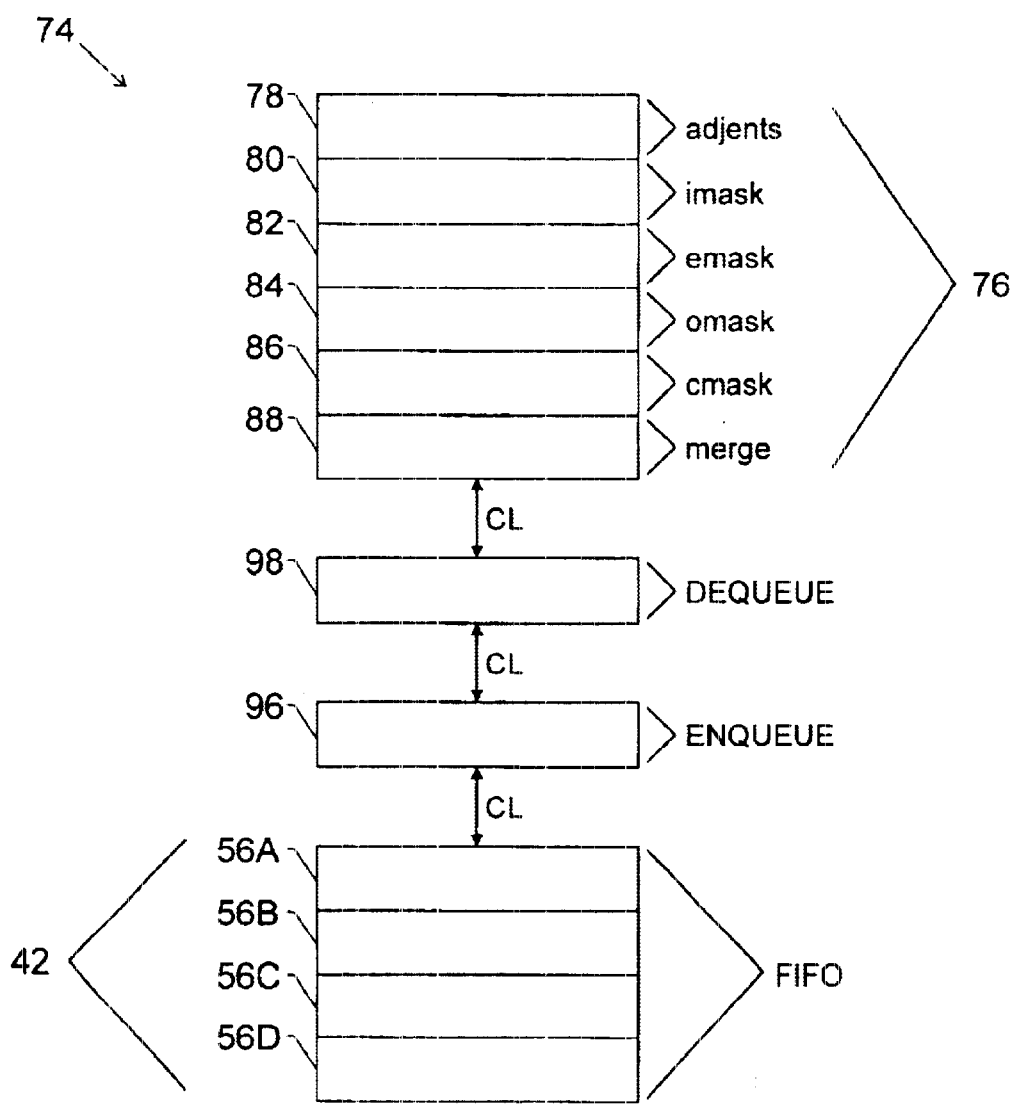
FIG. 6 illustrates an exemplary abstraction of a data structure for a concurrent non-blocking queue.

An abstraction of a data structure 74 which is used to implement the FIFO queue 42 having an array of entries 56a, 56b, 56c, and 56d that are operated upon by the enqueue function 46 and dequeue function 48 in the manner described above is illustrated in FIG. 6. The data structure 74 includes a header template 76 which includes several parameters used to define the queue 42. Because the data structure 74 includes the template 76, the queue 42 easily can be adapted for use in many different types of applications without having to rewrite software code or restructure the queue in any manner.

The parameters in the template 76 are determined during execution of a setup routine and are based on options selected via a user interface of the processor-based device. For example, in an exemplary embodiment, a user can select the number of bits of valid data for each entry 56 (BitsForData), the number of requested entries 56 for the queue 42 (rents), and whether the queue 42 will be accessible by cache-coherent entities only (Normal) or by both cache-coherent entities and a non-cache coherent entity. Based on the user's selections, the setup routine determines values for the template parameters and stores them in the data fields in the header 76 as read-only data. In the exemplary embodiment, the determined template parameters includes the adjusted number of entries (adjents) 78; an index mask (imask) 80 for the enqueue and dequeue pointers into the array of entries 56; a data mask (emask) 82 to indicate the location of the valid data bits in each entry 56; an occupied bit mask (omask) 84 to indicate the location of the Occupied bit in each entry 56; a consumed bit mask (cmask) 86 to indicate the location of the Consumed bit in each entry 56; and a merge mask (merge) 88 to indicate whether the Consumed bit should be set when data is enqueued (i.e., the "cache-coherent only" mode of operation has been selected).

Figure 7:
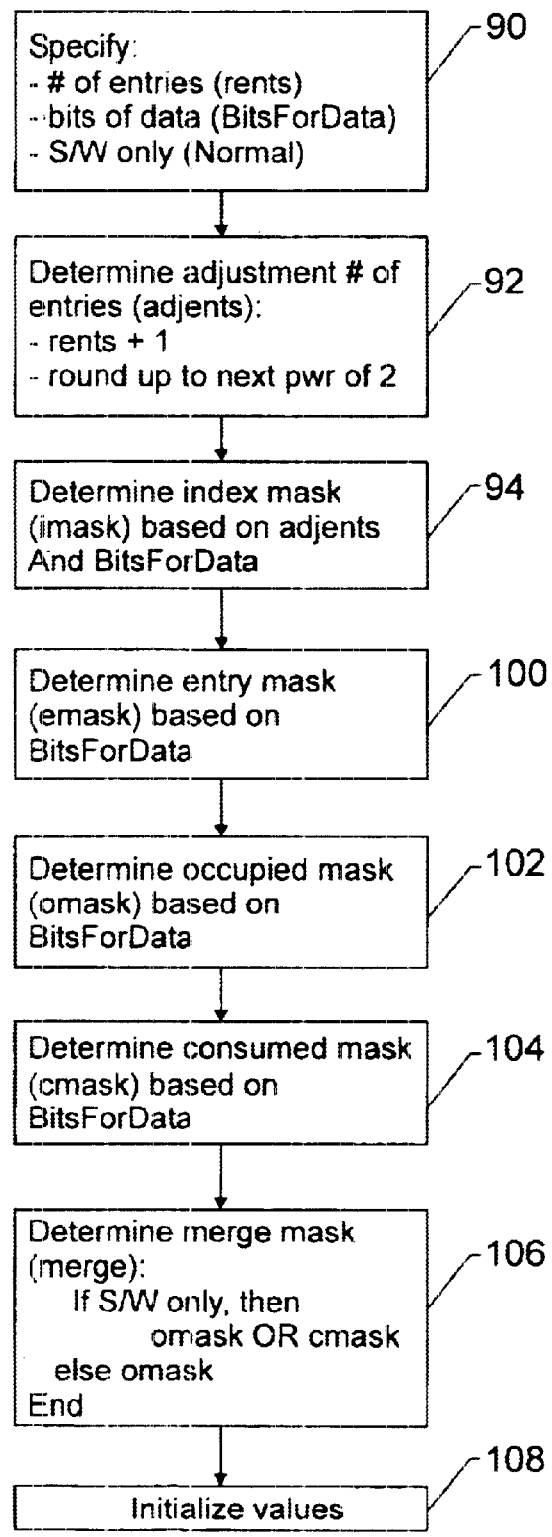
FIG. 7 is a flow chart illustrating an exemplary setup routine to establish parameters for the concurrent non-blocking queue structure shown in FIG. 6.

FIG. 7 illustrates an exemplary setup routine for determining values for the template parameters for the concurrent non-blocking queuing technique. As previously discussed, when setting up a queue 42 for the processor-based device, the user is provided the option to specify the number of entries desired (rents), the number of bits of valid data for each entry 56 (BitsForData), and whether queue 42 will be accessed only by software (Normal).

In the exemplary embodiment, the setup routine guarantees that the user will have at least the specified number of entries (rents) available in the queue 42. However, in the exemplary embodiment, the setup routine provides an adjusted number of entries 56 (adjent) in the queue 42 that is at least one entry more than the requested number of entries (rents). The addition of an extra entry facilitates determinations by the enqueue function 46 and dequeue function 48 regarding availability of the queue 42. For instance, by defining the full state of the queue 42 as having only one empty entry 56, the enqueue function 46 easily can determine whether the queue 42 is full (i.e., the current entry is not occupied, but the next entry is occupied). Further, by defining a full state in this manner, the enqueue function 46 also can easily determine whether the enqueue pointer has been properly incremented (i.e., the enqueue pointer should always be parked on an empty entry 56 in the queue 42). Similarly, the dequeue function 48 can determine whether the queue 42 is empty and whether the dequeue pointer has been properly incremented.

In addition to increasing the number of entries 56 in the queue 42 by one entry, the setup routine also rounds up the increased number to the next power of 2 (block 92) such that the enqueue and dequeue pointers can easily be matched to the wrapping order of the queue 42, as will be described below. Thus, if the user has requested 4 entries for the queue 42, the setup routine will adjust the actual number of entries such that 8 entries are provided (i.e., (4 entries+1 entry) rounded up to the next power of 2).

Also, in the exemplary embodiment, the setup routine limits the maximum number of valid bits (BitsForData) that the user may request to a value that is less than the access capability of the requester. For example, if the requester has an access capability of 32 bits, then the maximum value that may be specified for the user for the BitsForData field is limited to less than 32 bits. In one embodiment, two bits (i.e., the Consumed bit and the Occupied bit) are reserved to indicate the state of the data in the entry. Thus, for a requester having an access capability of 32 bits, the user can specify a maximum of 30 bits of valid data, and for a requester having a 64-bit access capability, the user can a maximum of to 62 bits. In other embodiments, the user may be limited to a different maximum number of bits. For example, it may be desirable to reserve a specific number of bits for the Count field, or to allocate more or fewer bits to indicate the state of the entry.

The setup routine also determines the configuration of the index mask (imask) based on the adjusted number of entries (adjent) and the BitsForData value (block 94). The index mask is used to adjust the pointers for the enqueue and dequeue functions into the queued array 42 of entries based on the natural wrapping order of the queue. Referring back to the data structure 74 illustrated in FIG. 6, the values for the enqueue and dequeue pointers are contained in the Enqueue field 96 and the Dequeue field 98, respectively. In the exemplary embodiment, the length of each field 96 and 98 is the length of a cache line (CL) for the particular processor-based device. Thus, the amount of data transmitted on the bus each time the dequeue pointer or the enqueue pointer is incremented can be minimized because each cache line contains only one variable.

However, because the number of bits in a cache line bears no relationship to the number of entries 56 in a queue 42, no direct correspondence may exist between the contents of the Enqueue and Dequeue fields 96 and 98 and the locations of the entries 56 in the queue 42. Thus, as the contents of the Enqueue and Dequeue fields 96 and 98 are incremented, the values of the enqueue and dequeue pointers will not have a direct relationship to the natural wrapping order of the queue 42. However, by creating an index mask that is based on the number of entries 56 in the queue 56 and combining the index mask with the contents of the enqueue and dequeue fields 96 and 98, an index is created that can set the enqueue and dequeue pointers to the appropriate entry 56 in the queue. For example, if the queue 42 is defined to have four entries 56, then all but the two least significant bits in the index mask 80 will be set to "0." When the imask 80 is combined with the contents of the Enqueue and the Dequeue fields 96 and 98, all but the two least significant bits of the fields 96 and 98 will be ignored. Thus, the index mask forces a correspondence between the incremented contents of the Enqueue and Dequeue fields 96 and 98 and the number of entries 56 in the queue 42.

Returning to FIG. 7, the setup routine determines the contents of the entry mask (emask) field 82 based on BitsForData specified by the user (block 100). For example, if the user requests 20 bits of an entry 56 for valid data, then the bits in the emask field 82 are set (e.g., set to "1") to correspond to the locations of the bits for valid data. Thus, by combining the contents of the emask field 82 with the contents of an entry 56, only bits representing the valid data in the Data field 58 will be transmitted to a requester.

The setup routine also determines the contents of the occupied mask (omask) field 84 based on the BitsForData specified by the user (block 102). For example, if the user requests 20 bits of data for an entry 56, then bits 0 to 19 of the entry 56 may contain data, and bit 21 may contain the Occupied bit 62 which indicates whether valid data has been enqueued in the particular entry 56. Thus, for instance, all bits in the omask field 84 may be set to "0" except for bit 21, which will be set to "1." By combining the contents of the omask field 84 with the contents of an entry 56, only the Occupied bit 62 will be transmitted to a requester.

Similarly, the setup routine determines the contents of the consumed mask (cmask) field 86 based on the BitsForData specified by the user (block 104). If the user requests 20 bits, and bits 0 to 19 of the entry 56 are used for the Data field 58, and bit 21 contains the Occupied bit 62, then bit 20 may contain the Consumed bit 60, which indicates whether the data in the particular entry 56 can be dequeued by the dequeue function 48. By combining the contents of the cmask field 86 with the contents of an entry 56, only the Consumed bit 60 will be transmitted to a requester.

The setup routine also determines the contents of the merge mask field 88 based on the BitsForData and whether the user has specified the "cache-coherent only" mode of access. The purpose of the merge mask 88 is to provide the capability for the queue 42 to be accessed either by cache-coherent entities only or by both cache-coherent entities and a non-cache-coherent entity (e.g., hardware) without having to alter the data structure of the queue 42. As discussed above, if both cache-coherent and non-cache-coherent entities have concurrent access to the queue 42, then the cache-coherent dequeue function 48 cannot be allowed to remove data from an entry 56 until the non-cache-coherent entity has completed its access to the particular entry 56. The non-cache-coherent entity indicates that its access is complete by changing the state of the Consumed bit 60 in the entry 56. The cache-coherent dequeue function 48 thus is configured to examine the state of the Consumed bit 60 before removing the contents of an entry 56.

If only cache-coherent entities have access to the queue 42, then, as discussed previously, the cache-coherent dequeue function 48 can remove the contents of an entry 56 as soon as possible. However, because the dequeue function 48 is configured to examine the Consumed bit 60 prior to removing the contents of the entry 56 even in the "cache-coherent only" mode, the merge mask 88 is used to ensure that the Consumed bit 60 indicates that the data can be removed at the time the data is loaded into the entry 56 by the enqueue function 46. The merge mask 88 also is used to ensure that the Occupied bit 62 indicates that an entry 56 is occupied when the data is loaded by the enqueue function 46. Accordingly, in the exemplary embodiment, when loading data into an entry 56 during an enqueue operation, the merge mask 88 is combined with the data to ensure that the Consumed bit 60 and the Occupied bit 62 are set to an appropriate state.

To perform this function, the setup routine determines the merge mask field 88 as indicated by the algorithm set forth in block 106 of FIG. 7. That is, if the user has selected the "cache-coherent only" access mode, then the contents of the merge mask field 88 represent a combination of the contents of both the omask field 84 and the cmask field 86. Thus, in the "cache-coherent only" mode, both the Occupied bit 64 and the Consumed bit 62 are set as a result of an enqueue operation. If the user has not selected the "cache-coherent only" access mode, then the contents of the merge mask field 88 represent the contents of the omask field 84 only. Thus, in this mode, only the Occupied bit 64 is set as a result of an enqueue operation, and the Consumed bit 62 will not be set until the non-cache-coherent entity has completed its access.

After determining the contents of the various fields discussed above, the setup routine initializes the contents of the entries 56 of the queue 42, the Enqueue pointer field 96, and the Dequeue pointer field 98 (e.g., fills all the bits in the fields with a "0") (block 108). Further, all values for the header fields 78, 80, 82, 84, 86, and 88 are written such that they are read-only values at runtime.

It should be understood that although the setup routine has been described in a particular order, the values determined by the setup routine may be performed in any order or in parallel. Further, the setup routine may be configured to determine the values for other parameters or additional parameters depending on the particular data structure of the queue 42.

Figure 8:
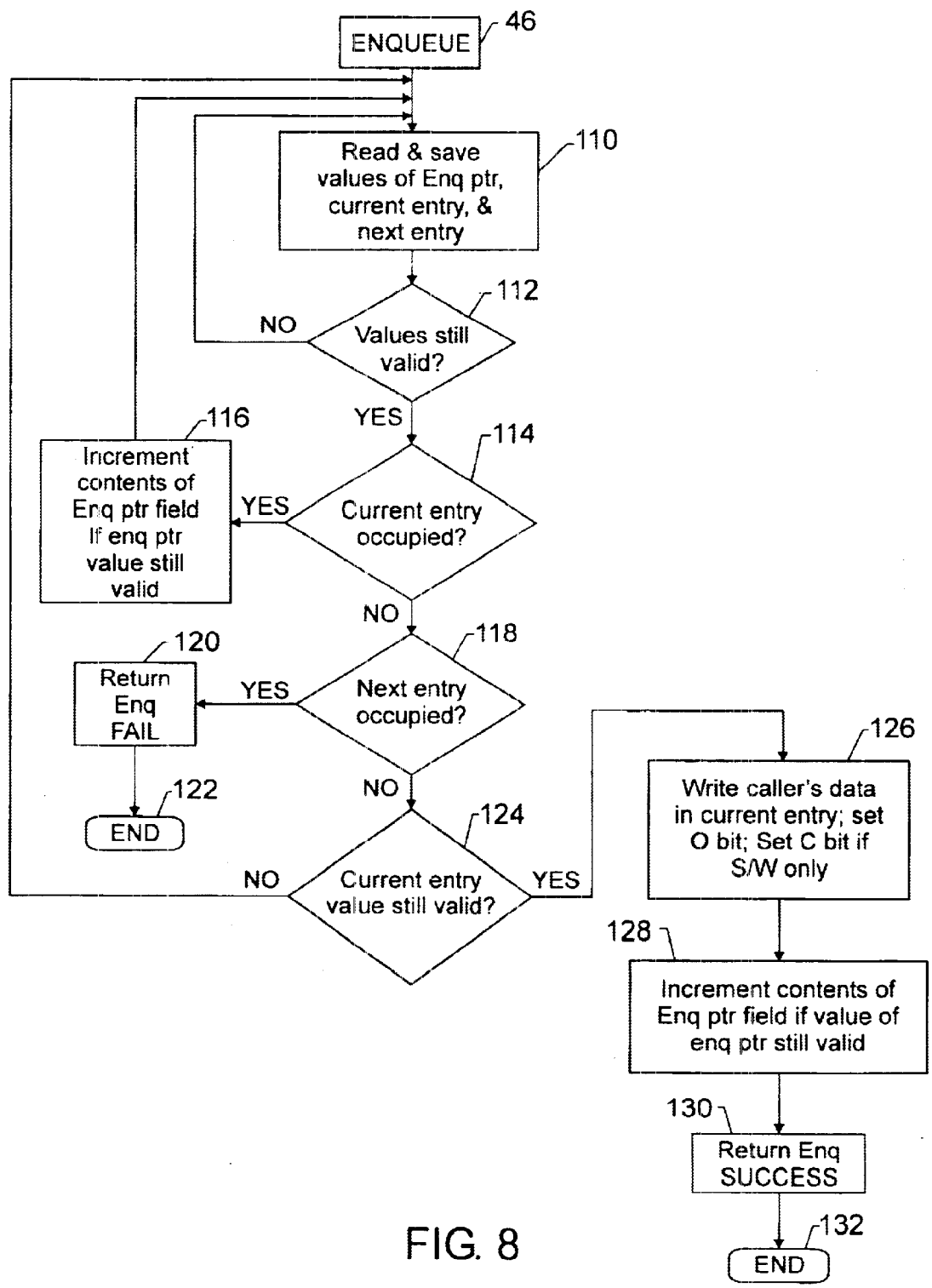
FIG. 8 is a flow chart illustrating an exemplary enqueue function for enqueuing data in the concurrent non-blocking queue structure shown in FIG. 6.
Figure 9A:
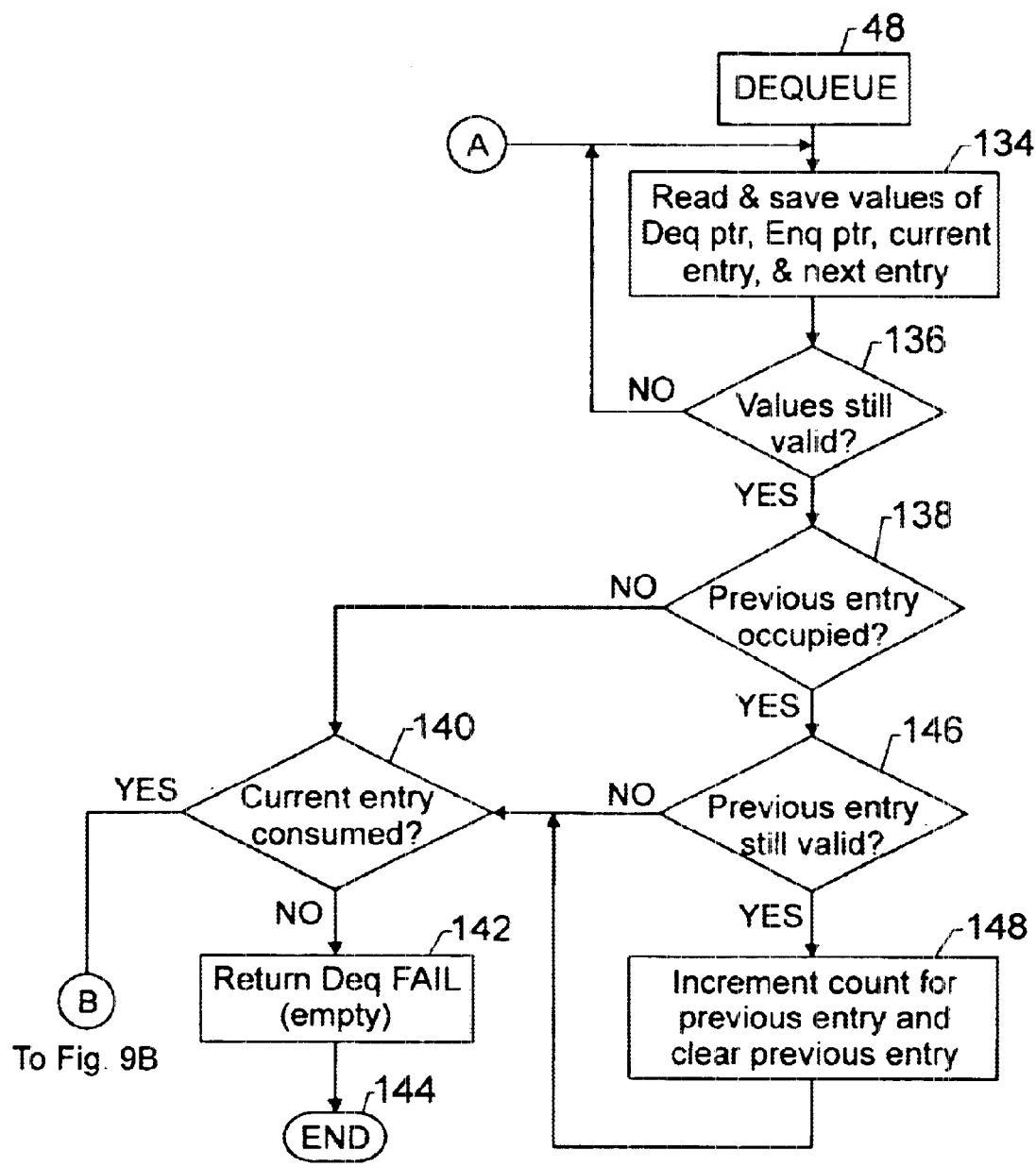
FIGS. 9A and 9B are a flow chart illustrating an exemplary dequeue function for dequeuing data from the concurrent non-blocking queue structure shown in FIG. 6.
Figure 9B:
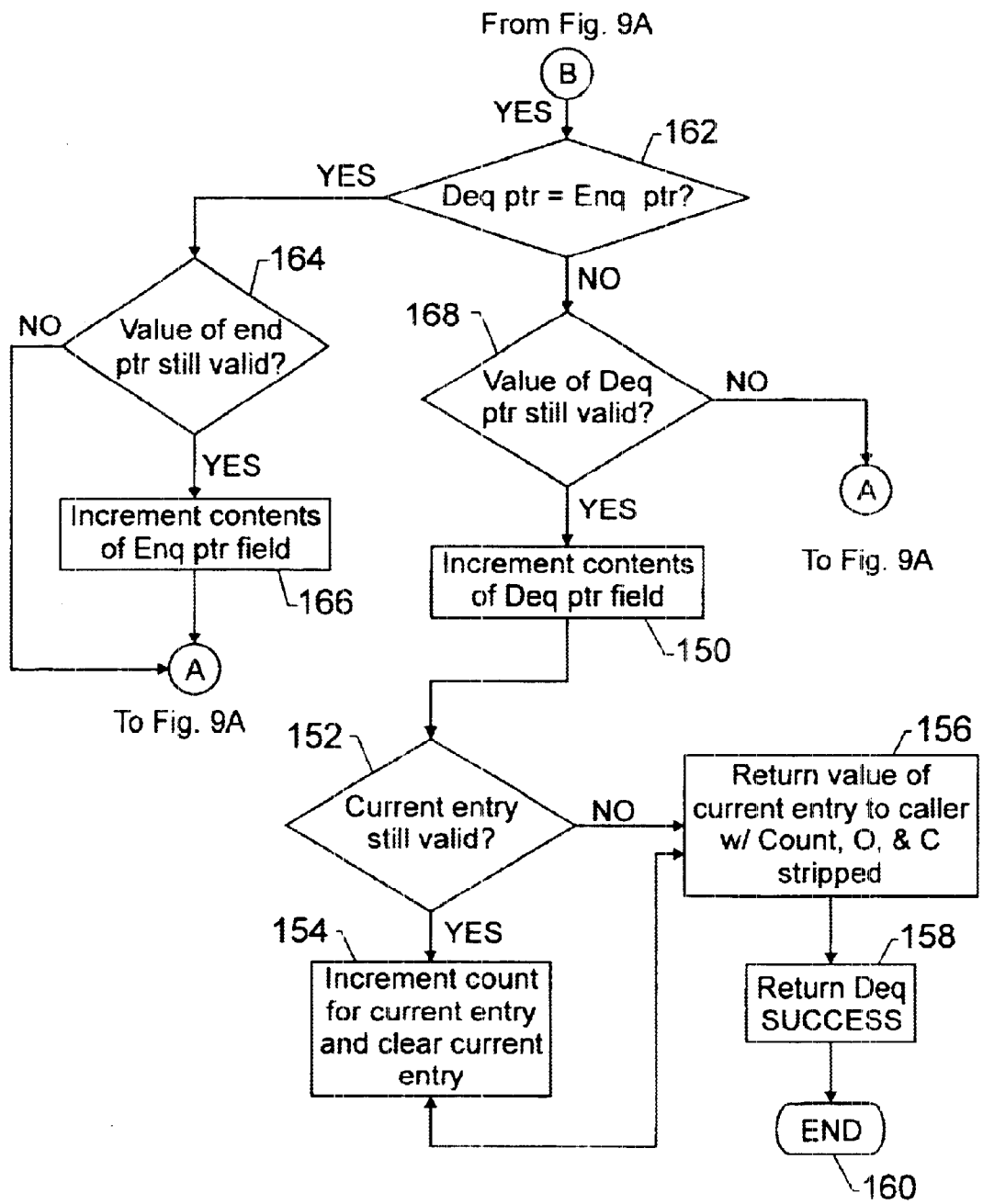

FIGS. 8, 9A, and 9B illustrate exemplary embodiments of an enqueue function 46 and a dequeue function 48 which may be utilized to implement the concurrent non-blocking queuing technique. The enqueue function 46 and the dequeue function 48 are configured to prevent anomalous conditions from hindering or preventing progress of an enqueue or dequeue requester and thus provide current non-blocking access to the queue 42. An anomalous condition may arise due to a requester (e.g., a previous requester, a current requester, a subsequent requester, or a concurrent requester) losing context during execution of its dequeue or enqueue function or due to a concurrent requester altering the contents of the queue 42 while a current requester is executing its dequeue or enqueue function. If an anomalous condition is encountered, then a queue failure is prevented by allowing the current requester to either automatically retry the enqueue or dequeue function, attempt to repair the anomaly and then retry the enqueue or dequeue function, or, in some instances, repair the anomaly and proceed with its function. By providing for repair of anomalies and automatic retry of enqueue and dequeue functions, concurrent access to the queue 42 is possible and progress by any requester on the queue 42 will not be hindered, regardless of the cause of the anomaly.

Turning now to FIG. 8, it illustrates an exemplary enqueue function 46 which is utilized to implement the concurrent non-blocking queuing technique. When a current requester requests access to load data into the queue 42, the enqueue function 46 is executed. First, a snapshot is stored of the contents of the Enqueue pointer field 96, the contents of the current entry indicated by the enqueue pointer (e.g., entry 56b), and the contents of the next entry after the current entry (e.g., entry 56c) (block 110). For instance, the contents of the Enqueue pointer field 96 first may be read and stored and then combined with the contents of the imask field 80 to determine the current entry 56b and the next entry 56c in the queue 42. The contents of the current entry 56b and the next entry 56c then may be read and stored.

Next, it is determined whether the stored snapshot values for the enqueue pointer, the current entry, and the next entry are still valid by comparing the snapshot values to the present contents of the Enqueue pointer field 96, the current entry 56b, and the next entry 56c (block 112). The comparison ensures that the contents of the queue 42 have not been changed by another requester since the time that the current requester took the snapshot. If the comparison fails, then the current enqueue function 46 is retried by returning to block 110 and taking another snapshot.

If the comparison is successful, then the state of the Occupied bit 62 is examined to determine whether the current entry 56b is available (block 114). In the exemplary embodiment, the Occupied bit 62 is examined by combining the contents of the current entry 56b with the contents of the omask field 84 such that only the Occupied bit 62 is returned to the requester. Because the queue 42 and the enqueue function 46 are defined such that the enqueue pointer should always be parked on an available entry, then the Occupied bit 62 should indicate that the current entry 56b is available. Thus, if the Occupied bit 62 indicates that the current entry 56b is not available, then an anomalous condition exists. For instance, it is possible that another requester that was executing an enqueue function 46 on the queue 42 was preempted or terminated before incrementing the enqueue pointer to the next entry or that another requester enqueued data into the current entry 56b before the current requester reached this point in the execution of the current enqueue function 46.

In any event, to prevent the current requester (or other requesters) from being blocked from the queue 42 because of the anomaly (i.e., the current entry is not available), the enqueue function 46 is configured such that the current requester can repair the anomaly by incrementing the contents of the Enqueue pointer field 96 (block 116). However, the current requester may increment the Enqueue pointer field 95 is the present contents of the field 96 still match the snapshot value. If a match does not occur, then another requester has incremented the enqueue pointer, and the current requester must retry the current enqueue function 45 (i.e., return to block 110) to find an available enqueue entry 56.

To ensure that an interruption does not occur that could further alter the contents of the queue 42, comparing and incrementing the contents of the Enqueue pointer field 96 are performed as an atomic operation. For example, a compare/exchange or compare-and-swap primitive may be executed to increment the enqueue pointer. Once the enqueue pointer has been incremented, the current enqueue function 46 may be retried by returning to block 110.

If the current entry 56b is available (block 114), then the enqueue pointer is pointing to the correct current entry in the queue 42. The current requester then determines whether the next entry 56c in the queue 42 is available (block 118). Because a full queue is defined as having only one empty entry between the beginning and the end of the queue, then if the next entry 56c is occupied, the queue 42 must be full. If the queue 42 is full, the enqueue function 46 returns a message to the current requester indicating that the current enqueue 46 failed (block 120). The current enqueue function 46 then terminates (block 122).

If, however the next entry 56c is available, then data may be loaded into the current entry 56b because the queue 42 is not full. Before loading the new data, the present contents of the current entry 56b again are compared to the current requester's snapshot value to ensure that the current entry 56b still is valid (block 124). If the comparison fails, the current requester must retry the enqueue operation by returning to block 110.

If the comparison is successful, then the new data may be written to the current entry 56b (block 126). To ensure that the contents of the queue 42 are not altered between the time the present contents of the current entry 56b are verified (block 124) and the new data is written to the current entry 56b (block 126), the verification and write operations are performed as an atomic operation (e.g., by executing a compare/exchange or a compare-and-swap primitive). In the exemplary embodiment, when the new data is written to the current entry 56b, the write operation also sets the state of the Occupied bit 62 to indicate that the current entry 56b no longer is available. Further, if the "cache-coherent only" access mode has been selected, the Consumed bit 60 also is set to indicate that the current entry 56b may be removed as soon as possible. As discussed above, the write operation may be performed by combining the requester's data with the contents of the merge mask field 88 such that the Occupied and Consumed bits 60 and 62 are set in an appropriate manner based on the mode of operation.

Once the new data has been loaded into the current entry 56b, the contents of the Enqueue field 96 may be incremented such that the enqueue pointer indicates the new current entry (i.e., entry 56c) (block 128). However, because requesters can have concurrent access to the queue 42, it is possible that another requester already has incremented the enqueue pointer. Thus, the current request cannot increment the enqueue pointer unless the present contents of the field 96 still match the snapshot value. In the exemplary embodiment, comparing incrementing the enqueue pointer are performed as an atomic operation to ensure no interruptions.

Regardless of whether the enqueue pointer is incremented as part of the current enqueue function or a previous enqueue function, the current enqueue function 46 now may return a message to the current requester indicating that the data was successfully loaded (block 130). The current enqueue function 46 then terminates (block 132). If the current requester loses context after the new data was loaded but before the enqueue pointer was incremented, the enqueue function 48 ensures that another requester will not be blocked from the queue 42 by allowing the other requester to increment the enqueue pointer (i.e., blocks 114 and 116) as discussed above.

Turning now to FIGS. 9A and 9B, they illustrate an exemplary dequeue function 48 which is utilized in conjunction with the enqueue function 46 to implement the concurrent non-blocking queuing technique. When a current requester requests data from the queue 42, the dequeue function 48 is executed. First, a snapshot is stored of the contents of the Dequeue pointer field 98, the Enqueue pointer field 96, the current dequeue entry indicated by dequeue pointer (e.g., entry 56b), and the next dequeue entry (e.g., entry 56c) (block 134). For instance, the contents of the Dequeue pointer field 98 first may be read and stored and then combined with the contents of the imask field 80 to determine the current dequeue entry 56b and the next dequeue entry 56c in the queue 42. The contents of the current dequeue entry 56b and the next dequeue entry 56c then may be read and stored.

Next, it is determined whether the stored snapshot values for the dequeue pointer, the enqueue pointer, the current dequeue entry, and the next dequeue entry are still valid by comparing the stored snapshot values to the present contents of the Dequeue pointer field 98, the enqueue pointer field 96, the current dequeue entry 56b, and the next dequeue entry 56c (block 136). The comparison ensures that the contents of the queue 42 have not been altered by another requester since the time that the current requester took the snapshot. If the comparison fails, then the current dequeue operation is retried by returning to block 134 and taking a new snapshot.

If the comparison is successful, then the state of the Occupied bit 62 of the previous dequeue entry 56a is examined to determine whether the previous dequeue entry 56a is available (block 138). In the exemplary embodiment, the Occupied bit 62 is examined by combining the contents of the previous dequeue entry 56a with the contents of the omask field 84 such that only the Occupied bit 62 is returned to the requester. Because the queue 42 and the dequeue function 48 are defined such that the previous dequeue entry 56a already should have been removed (i.e., the dequeue pointer should be incremented and the contents of the previous dequeue entry 56a should be cleared), then the previous entry 56a should not be occupied.

If the previous dequeue entry 56a is not occupied, then the state of the Consumed bit 60 of the current dequeue entry 56b is examined to determine whether the contents may be removed (block 140). The Consumed bit 60 is examined by combining the contents of the current entry 56b with the contents of the cmask field 86 such that only the Consumed bit 60 is returned to the requester. If the Consumed bit 60 indicates that the contents of the current dequeue entry 56b have not been consumed, then the dequeue function 48 returns a message to the current requester indicating that the dequeue operation failed (i.e., either the contents are not ready to be removed or the queue 42 is empty) (block 142). The dequeue function 48 then terminates (block 144).

In the exemplary embodiment of the dequeue function 48 illustrated in FIGS. 9A and 9B, to avoid blocking subsequent requesters from the queue 42, the contents of the Dequeue pointer field 98 are incremented before the current dequeue entry is cleared and the dequeue data returned to the current dequeue requester. Further, as discussed previously with respect to the ABA race condition, the dequeue function 48 is configured to increment the contents of the Count field 64 each time a dequeue occurs. Accordingly, it is possible for a dequeue requester to lose context after incrementing the dequeue pointer, but before clearing the dequeue entry, incrementing the Count field 64, and receiving the contents of the Data field 58. However, by incrementing the dequeue pointer before removing the data, the dequeue function 46 ensures that the dequeue pointer will direct a new current dequeue requester to a different entry 56 in the queue 42, thus allowing progress of the new request to proceed. Further, incrementing the dequeue pointer before clearing the current entry ensures that other requesters will not be able to access the current entry 56b.

Returning to block 138, if a current dequeue requester finds that the previous dequeue entry 56a is occupied, an anomalous condition exists. The current requester then determines whether the anomaly can be repaired. Accordingly, the current requests compares the present contents of the previous entry 56a to the snapshot value for the previous entry 56a (block 146). If the comparison results in a match, then a previous requester was preempted before clearing the entry. Thus, the current requester may attempt to repair the anomaly by clearing the Data field 58, the Occupied bit 62, and the Consumed bit 60 of the previous entry 56a and incrementing the contents of the Count field 64 (block 148). In the exemplary embodiment, the compare, clear, and increment operations in blocks 146 and 148 are performed as an atomic operation (e.g., by executing a compare/exchange or a compare-and-swap primitive). After the current requester repairs the previous entry 56a, progress of the current dequeue function 48 can go forward by proceeding to block 140.

Returning to blocks 146 and 148, even though the current requester has performed an uncompleted portion of the previous requester's dequeue function 48, the previous dequeue function 48 still can be successfully completed by the previous requester when it regains context. For example, assume that the previous requester lost context after incrementing the contents of the Dequeue pointer field 98 (block 150). When the previous requester regains context, it will examine the present contents of its current entry (which is now a previous entry 56a) and find that the present contents do not match its snapshot value for the entry (block 152). This anomalous condition may occur, for instance, if a subsequent requester performed an atomic operation that both cleared the previous entry 56a and incremented the count (blocks 146 and 148). Thus, because a portion of the previous requester's dequeue function 48 already has been performed (i.e., clearing the entry and incrementing the count), the previous dequeue now can be completed by simply returning to the previous dequeue requester the snapshot value of the contents of the entry 56a which had been stored as part of the previous dequeue function 48 (block 156). The previous dequeue is then indicated as being successfully completed (block 158), and the previous dequeue function 48 terminates (block 160).

Returning now to block 146, a scenario may occur in which the current requester finds that the present contents of the previous entry 56a do not match the current snapshot value. This scenario may occur, for instance, if another requester intervened and altered the contents of the previous entry 56a (e.g., a requester repaired an anomalous condition, the previous requester regained context and altered the previous entry 56a, etc.). In any case, any change of the contents also must have resulted in an increment of the contents of the Count field 64. Accordingly, if the present contents of the previous entry do not match the snapshot, the current requester need not attempt any type of repair and instead may proceed with its dequeue operation and determine whether the current entry 56b has been consumed (block 140).

If the current entry 56b has been consumed (either because the non-cache-coherent entity already has accessed the entry 56b or the queue 42 is configured in "software only" or "cache-coherent only" mode), then the snapshot value of the dequeue pointer is compared to the snapshot value of the enqueue pointer (block 162). The snapshot enqueue and dequeue pointer values may match if, for instance, due to the actions of concurrent requesters on the queue 42, or it a previous requester lost context before incrementing a pointer value. Accordingly, if the snapshot values of the dequeue and enqueue pointers match at block 162, then the current requester must correct the anomaly such that the progress of the current dequeue function 48 can proceed.

To do this, the current requester determines whether the snapshot value of the enqueue pointer still is valid by comparing the snapshot value to the present contents of the Enqueue pointer field 96 (block 164). If the snapshot is not valid, then another requester has intervened and altered the contents of the Enqueue pointer field 96, and the current requester retries the current dequeue function 48 to find a valid dequeue entry 56 in the queue 42 (i.e., return to block 134 to read and save new values). If, however, the snapshot of the enqueue pointer value still is valid, then the current requester may fix the anomalous condition by incrementing the contents of the Enqueue pointer field 96 (block 166) and then restart the current dequeue function 48. In the exemplary embodiment, blocks 164 and 166 are performed as an atomic operation to prevent interruption by other requesters. Again, by allowing the current requester to fix the anomalous condition, the progress of requesters on the queue 42 will not be hindered.

Returning to block 162, if the snapshot values of the enqueue and dequeue pointers do not match, then the current requester verifies that the snapshot value of the dequeue pointer still is valid by comparing it to the present contents of the Dequeue pointer field 98 (block 168). If the value is not valid, then an anomalous condition exists and the dequeue operation should not be performed. Thus, the current dequeue function 48 is restarted by returning to block 134.

If the snapshot dequeue pointer still is valid, then no anomaly exists, and the current dequeue function 48 may proceed. Next, the contents of the Dequeue pointer field 98 are incremented such that other requesters will be informed that the current requester will be removing the contents of the current entry 56b (block 150). In the exemplary embodiment, verification of the snapshot dequeue pointer value (block 168) and incrementing the contents of the dequeue pointer field 98 (block 150) are performed as an atomic operation (e.g., a compare/exchange or a compare-and-swap primitive).

After incrementing the dequeue pointer field 98, all that remains to complete the current dequeue function 48 is to clear the current entry 56b, increment the count in the Count field 64 to assist with avoidance of the ABA race condition, and return the contents of the Data field 58 of the current entry 56b to the current requester. If, at this point, the contents of the current entry 56b still are valid (block 152), then the Data field 58, the Consumed bit 60, and the Occupied bit 62 are cleared and the contents of the Counts field 64 incremented (block 152). Again, verification of the value of the current entry 56b (block 152) and clearing/incrementing the current entry 56b (block 154) are performed as an atomic operation (e.g., compare/exchange or compare-and-swap). The snapshot value of the contents of the Data field 58 then is returned to the dequeue requester (block 156). In the exemplary embodiment, the contents of the current entry 56b are combined with the emask 82 such that only the bits representing the valid data in the current entry 56b are returned to the current requester.

If the contents of the current entry 56b are no longer valid (block 152), then another requester has intervened and found and repaired an anomalous condition by clearing the entry 56b and incrementing the count. Accordingly, to complete the current dequeue function 48, only the snapshot value of the data in the current entry 56b need be returned to the current requester (block 156). The dequeue function 48 then may be indicated as successfully completed (block 158) and terminated (block 160).

It should be understood that the concurrent non-blocking queuing technique described above with respect to FIGS. 7, 8, 9A, and 9B may be implemented in software code embedded in a processor-based device, may exist as software code stored on a tangible medium such as a hard drive, a floppy disk, a CD ROM, etc., or may be implemented in silicon in the form of an application specific integrated circuit (ASIC), as well as in any other suitable manner.

Still further, while the embodiments described above have included processor-based devices which have multiple processors, it should be understood that the invention also is applicable to single-processor device in which multiple entities (e.g., multiple threads, software and hardware) have concurrent access to a shared resource. Further, it should be understood that the ABA race condition described above may not occur for all types of computer architectures. If the ABA condition is not a concern, the data structure for the queue 42 may not include a Count field. Nonetheless, the principles of the concurrent non-blocking enqueue and dequeue functions described above will still be applicable.

Thus, it should be clear that the invention may be susceptible to various modifications and alternative forms, and that specific embodiments have been shown in the drawings and described in detail herein by way of example only. Further, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A concurrent non-blocking queue, comprising:

a plurality of entries arranged in a circular queue and configured such that a plurality of requesters have access to enqueue data to and dequeue data from the queue;

enqueue logic to direct an enqueue access to a current enqueue entry of the plurality of entries; and dequeue logic to direct a dequeue access to a current dequeue entry of the plurality of entries, wherein the enqueue logic and dequeue logic cooperate such that the plurality of requesters can perform concurrent accesses on the circular queue, and wherein the queue is configurable in one of a cache-coherent only mode in which only cache-coherent requesters of the plurality of requesters have access to the circular queue and a non-cache-coherent mode in which a non-cache-coherent requester of the plurality of requesters may access the circular queue.

2. The queue as recited in claim 1, wherein the dequeue logic is configured such that data cannot be dequeued from an entry until the entry is marked as available for dequeuing.

3. The queue as recited in claim 2, wherein, in the cache-coherent only mode, the entry is marked as available for dequeuing when the data is enqueued in the entry.

4. The queue as recited in claim 2, wherein, in the non-cache-coherent mode, the entry is marked as available for dequeuing after an access to the entry has been completed by the non-cache-coherent requester.

5. The queue as recited in claim 2, wherein each entry comprises:

a data field to store data; and a consumed field, wherein contents of the consumed field are representative of whether the entry is available for dequeuing.

6. The queue as recited in claim 5, wherein the contents of the consumed field comprise a consumed bit, and wherein, in the cache-coherent only mode, the state of the consumed bit is set to indicate the entry is available for dequeuing when an enqueue access is performed on the entry.

7. The queue as recited in claim 5, wherein the contents of the consumed field comprise a consumed bit, and wherein, in the non-cache-coherent mode, the state of the consumed bit is set to indicate the entry is available for dequeuing when an access on the entry by the non-cache-coherent requester is completed.

8. The queue as recited in claim 5, wherein each entry comprises a count field to store a count that is incremented each time the data is dequeued from the entry.

9. The queue as recited in claim 1, wherein the enqueue logic is configured to detect and repair an anomalous condition on the circular queue that hinders successful completion of an access on the circular queue.

10. The queue as recited in claim 9, wherein the anomalous condition is detected if the enqueue pointer is not indicating a valid current enqueue entry.

11. The queue as recited in claim 10, wherein the enqueue logic repairs the anomalous condition by incrementing the enqueue pointer.

12. The queue as recited in claim 1, wherein the dequeue logic is configured to detect and repair an anomalous condition on the circular queue that hinders successful completion of an access on the queue.

13. The queue as recited in claim 12, wherein the anomalous condition is detected if the dequeue pointer is not indicating a valid current dequeue entry.

14. The queue as recited in claim 13, wherein the dequeue logic repairs the anomalous condition by retrying the current dequeue request.

15. The queue as recited in claim 13, wherein the anomalous condition is detected if a previous dequeue entry is occupied, and the dequeue logic repairs the anomalous condition by clearing the previous dequeue entry.

16. The queue as recited in claim 1, wherein in the non-cache-coherent mode, the plurality of requesters comprises a software requester and a hardware requester.

17. The queue as recited in claim 1, wherein the plurality of requesters comprises a plurality of software threads.

18. The queue as recited in claim 1, wherein the plurality of requesters comprises a plurality of processors.

19. A concurrent non-blocking queue, comprising:

a plurality of entries arranged in a circular queue concurrently accessible by a plurality of requesters;

enqueue logic to enqueue data into the queue, wherein the enqueue logic provides an enqueue pointer to a current enqueue entry of the plurality of entries; and dequeue logic to dequeue data from the queue, wherein the dequeue logic provides a dequeue pointer to a current dequeue entry of the plurality of entries, wherein the enqueue logic and the dequeue logic are configured to detect and repair an anomalous condition hindering completion of a request on the circular queue.

20. The queue as recited in claim 19, wherein the anomalous condition comprises an invalid current entry, and wherein the repair comprises incrementing the enqueue pointer.

21. The queue as recited in claim 20, wherein the invalid current entry comprises a current enqueue entry that is occupied.

22. The queue as recited in claim 19, wherein the repair comprises retrying the current request.

23. The queue as recited in claim 19, wherein the anomalous condition comprises an occupied previous dequeue entry, and wherein the repair comprises clearing the previous dequeue entry.

24. The queue as recited in claim 19, wherein the circular queue is configurable in one of a cache-coherent only mode in which the plurality of requesters comprises only cache-coherent requesters, and a non-cache-coherent mode in which the plurality of requesters comprises a cache-coherent requester and a non-cache-coherent requester.

* * * * *